(12) United States Patent
Billau et al.

(10) Patent No.: US 7,330,417 B2
(45) Date of Patent: Feb. 12, 2008

(54) STORAGE DEVICE HAVING SUPERSET FORMAT, METHOD AND SYSTEM FOR USE THEREWITH

(75) Inventors: Ronald L. Billau, Rochester, MN (US); Lee D. Cleveland, West Concord, MN (US); James R. Gathman, Rochester, MN (US); James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 10/986,609

(22) Filed: Nov. 12, 2004

(65) Prior Publication Data

US 2006/0117243 A1    Jun. 1, 2006

(51) Int. Cl.
*G11B 20/12* (2006.01)
(52) U.S. Cl. .................... 369/59.25; 360/48
(58) Field of Classification Search ............ 360/48; 369/59.25
See application file for complete search history.

(56) References Cited

U.S. PATENT DOCUMENTS

| 6,115,678 | A | 9/2000 | Lieb et al. |
| 6,179,486 | B1 | 1/2001 | Wallach et al. |
| 6,249,828 | B1 | 6/2001 | Wallach et al. |
| 6,332,182 | B1 | 12/2001 | Geldman et al. |
| 6,460,094 | B1 | 10/2002 | Hanson et al. |
| 6,845,072 | B1* | 1/2005 | Weirauch .......... 369/59.25 |
| 2004/0044705 | A1* | 3/2004 | Stager et al. .......... 707/204 |
| 2005/0105441 | A1* | 5/2005 | Lee .................. 369/59.25 |

* cited by examiner

*Primary Examiner*—R. Stephen Dildine
(74) *Attorney, Agent, or Firm*—Cantor Colburn LLP; Lilly Neff

(57) ABSTRACT

A storage device comprising a storage medium having a plurality of sectors and a superset format. Each sector includes a header, a data section and a trailer, the data section sized to contain a number of bytes per sector equal to or greater than a maximum of subset formats to be supported. Meta data in a non-user portion of the storage medium includes a flag for indicating a subset format such that each sector is formatted to store less than the number of bytes.

15 Claims, 3 Drawing Sheets

| Header | Fixed Length Data | 512 Bytes | Trailer |

| Header | Fixed Length Data | 522 Bytes | Trailer |

| Header | Fixed Length Data | 524 Bytes | Trailer |

FIG. 1
PRIOR ART

| Header | Fixed Length Data | 512, 522, 524 Bytes | | Trailer |

STORAGE DEVICE HAVING SUPERSET FORMAT, METHOD AND SYSTEM FOR USE THEREWITH

BACKGROUND

The invention relates to storage devices in general, and in particular to a storage device having a superset format, and a method and system for using the storage device. Manufacturers find it desirable to use common parts across multiple products. Common parts reduce part cost since it is possible to order and purchase larger quantities from suppliers. Higher volume purchases translate into less per unit costs. Order volume of common parts will increase as the part is used in more and more server models and machine types. Take for example 5 individual power supply designs that have orders for 1,000 parts each. If the 5 individual power supply designs could have been a single common design, there would now be a single order for 5,000 of the common power supply in all likelihood at a reduced per unit price. More common parts reduce inventory costs and manufacturing carrying charges by making the manufacturer less dependent on the accuracy of machine-type and model sale forecast projections.

Fewer, more common parts, should result in fewer quality problems. Significant reductions in the number of unique parts should provide the opportunity to do a better, more thorough job of bringing parts into the business and managing them with the same resource. Qualification and testing would also be more thorough. This is especially important where subtle differences in operating characteristics of complex electronics can result in intermittent difficult-to-diagnose problems. Fewer more common parts provide more opportunity to second source parts that can be leveraged if quality problems with a particular supply line arise.

Computer systems often require a considerable amount of nonvolatile disk storage to preserve software, programs and other data that can not fit in the smaller more costly RAM memory and that otherwise would be lost when the system is power is turned off. At present, it is common for these storage systems to be built using a large number of Hard Disk Drives (HDDs). HDDs are constructed using one or more disk shaped platters coated with a magnetic material. The disk platters spin at fixed speeds and a movable arm with a read/write head is directed to specific locations on the disk to write data or read data. The head assembly glides just above the surface of the platter. During a data write operation it applies an electric field to a specific location on the disk creating a substantially permanent magnetic field in a specific direction. If the field points in one direction it represents a binary "1" and if it points in the other direction is represents a binary "0". The head assembly is designed to read stored data by sensing the small current induced in the head assembly by the magnetic field when in passes over the magnetized location on the platter. When the HDD is powered off, the data is preserved by the magnetic signature, the bits of information at specific locations on the disk.

HDD platters are partitioned into concentric circles called tracks that are coincident with areas over which the head glides when the arm assembly remains motionless. Each track is further partitioned into sectors. Each sector contains a larger fixed length area for the customer data as well as header and trailer information used by the HDD electronics during the data storing and retrieval process. Data read and write times called latency are not fixed and predictable as they are in RAM. The latency, to a large extent, is a function of the seek time, the time it takes the arm to reposition the head over the track where the data is to be stored or retrieved. That time is variable and a function of the last position of the arm.

Each HDD platter is formatted, pre-written, with data used by the electronics and microcode in the HDD and HDD adapter to store and retrieve data. The formatting typically involves sector header and trailer information as well as a standard fixed size data field where a set number of bytes per sector are allocated to store user data. It is common for HDDs to contain not only user data but a small area of "nonuser" data where vital product data (VPD), information useful to the operating system or firmware, is stored. For example, IBM eServer® systems have evolved with unique formats fine tuned to enhance system performance. For example, xSeries and pSeries utilize 512 bytes per sector formats. However there are some subtle format differences in VPD between pSeries and xSeries that prevent plug compatible substitution. iSeries uses 522 bytes per sector that is an artifact of the OS/400 operating system as well as providing enhanced data integrity capability. Total Storage systems typically have 524 bytes per sector. FIG. 1 depicts three exemplary hard formatted sectors. The first sector features 512 bytes per sector, the second sector features 522 bytes per sector and the third sector 524 bytes per sector. The bytes per sector are fixed and a sector cannot accommodate a different format. There are also different HDD functional requirements (e.g. skip read/write, error recovery) between the eServer systems which result unique HDD firmware per Series.

HDDs are typically designed as self contained assemblies that can be plugged into a standard slot in the computer chassis or in a separate storage chassis. Separate storage drawers typically hold anywhere from a half dozen to as many as 50 or more individual HDDs. A storage chassis can be either a stand-alone assembly or a rack mountable unit to allow multiple drawers to be placed into a single rack creating a relatively large array of HDDs in a small physical foot print. Drive density per unit area floor space is a competitive metric used in the industry to help potential customers compare offerings from different vendors.

The storage capacity of computer systems often needs to be increased. Currently, adding storage capacity involves purchasing additional HDDs and either scheduling time for a customer engineer to bring the new equipment and install the HDDs in the system or waiting for HDDs to be shipped directly to the customer location and installed by the customer. In addition, if the customer's storage drawers are already filled to capacity, new storage drawers would need to be purchased and installed. Additional racks might also be required.

Different computer systems often require HDDs with different formats which need to be stocked and inventoried as distinct parts with unique part numbers. The greater the number of unique parts, the more complex it is to manage and thus the greater the overall end-to-end costs a business will incur.

HDD technologies continue to evolve. Higher density, greater speed devices, different types of disk device are being created at an ever accelerating rate of change creating an extraordinarily large number of device types and part numbers that need to be supported driving up inventory, scrap, quantity of field spares and other end-to-end costs. It is desirable, in order to simplify manufacturing operations, field service support, and customer operations to reduce the number of unique HDD PNs.

SUMMARY

One aspect of the invention is a storage device comprising a storage medium having a plurality of sectors and a superset format. Each sector includes a header, a data section and a trailer, the data section sized to contain a number of bytes per sector equal to or greater than a maximum of subset formats to be supported. Meta data in a non-user portion of the storage medium includes a flag for indicating a subset format such that each sector is formatted to store less than the number of bytes.

Another aspect of the invention is a method of configuring a storage device comprising detecting a presence of a storage device having a storage medium having a plurality of sectors and a superset format. Each sector includes a header, a data section and a trailer, the data section sized to contain a number of bytes per sector equal to or greater than a maximum of subset formats to be supported. Configuration data is accessed to determine a subset format for the storage device to interface with an operating system. The storage device is configured to the subset format without reformatting the storage device. A flag is set on the storage device designating the subset format.

Another aspect of the invention is a storage medium encoded with machine-readable computer program code configuring a storage device, the storage medium including instructions for causing a processor to implement a method. The method includes detecting a presence of a storage device having a storage medium having a plurality of sectors and a superset format. Each sector includes a header, a data section and a trailer, the data section sized to contain a number of bytes per sector equal to or greater than a maximum of subset formats to be supported. Configuration data is accessed to determine a subset format for the storage device to interface with an operating system. The storage device is configured to the subset format without reformatting the storage device. A flag is set on the storage device designating the subset format.

BRIEF DESCRIPTION OF THE DRAWINGS

FIG. 1 depicts sector formatting in a conventional HDD.

FIG. 2 depicts sector formatting for a storage device in an exemplary embodiment of the invention.

DETAILED DESCRIPTION

Figure 3:
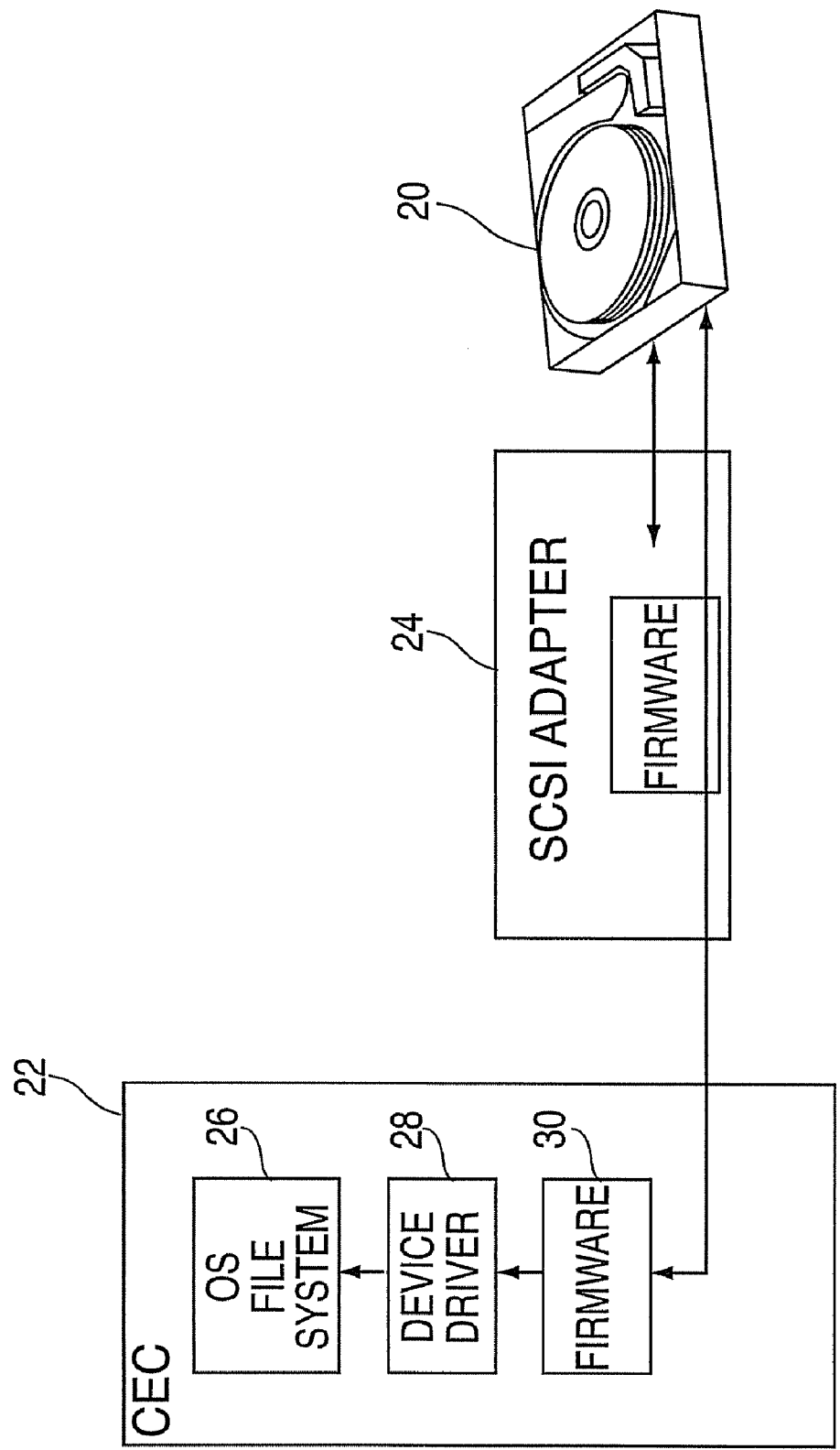
FIG. 3 is a block diagram of a system for interfacing with a storage device in an exemplary embodiment of the invention.

Embodiments of the invention dynamically recognize that a storage device has a superset format and automatically uses only the subset bytes per sector needed by the system without some type of reformatting operation external to the system. FIG. 2 depicts sector formatting for a storage device in an exemplary embodiment of the invention. As shown in FIG. 2, the sector features a header 12, a data section 14 and a trailer 16. The data section 14 is sized so that an upper limit of bytes per sector is available. For example, the data section 14 may be sized to accommodate a number of bytes equal to or greater than a maximum subset formal (e.g., 528 bytes per sector). This format is referred to as a superset format. As described in further detail herein, once the storage device is used, the system interfacing with the storage device specifies the bytes per sector. This specified format is referred to as a subset format. If less that 528 bytes per sector are needed, then a portion 18 of the data section 14 is unused.

FIG. 3 is a block diagram of a system for interfacing with a storage device 20 in an exemplary embodiment of the invention. The storage device 20 may be an HDD initially set in the superset format having a maximum available bytes per sector (e.g., 528 bytes) in a storage medium. The system includes a processor referred to as a central electronic complex (CEC) 22, a peripheral interface 24 such as a small computer system interface (SCSI) adapter and storage device 20. The CEC includes operating system file system 26, a device driver 28 and firmware 30. The operating system file system 26 includes information on how the storage device 20 should be configured.

In operation, the CEC (e.g., device driver 28 or firmware 30) or the peripheral interface 24 recognizes that the storage device 20 is a superset compliant device, and sets the appropriate subset format to configure the storage device 20. By modifying exiting system microcode to recognize this new superset format, storage device 20 is downward compatible, usable in older generation systems.

Figure 4:
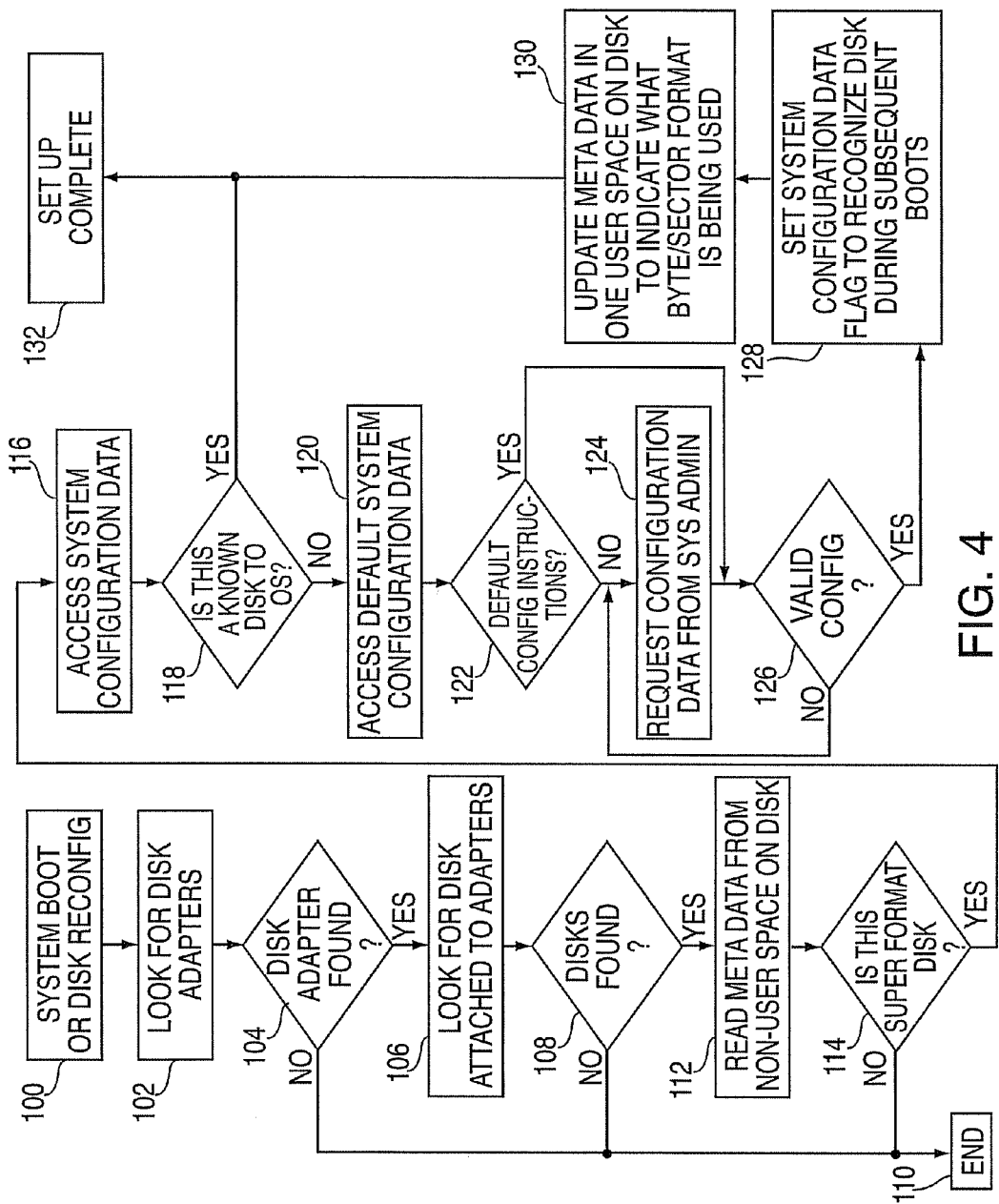
FIG. 4 is flow chart of a process for interfacing with a storage device in an exemplary embodiment of the invention.

FIG. 4 is flow chart of a process for interfacing with storage device 20 in an exemplary embodiment of the invention. The disk adapter code in the peripheral interface 24, system firmware 30 and/or device drivers 28 are configured to recognize the dynamic superset format of storage device 20.

The process starts at step 100 during power on, system initialization/reset or when a dynamic superset formatted storage device 20 is first plugged into a system. At step 102, the CEC 22 attempts to locate a peripheral interface 24 such as an SCSI disk adapter. If no interface is found at step 104, the process terminates at step 110. If an interface is found, flow proceeds to step 106 where the system attempts to locate a storage device (e.g., disk). If no storage device is found at step 108, the process terminates at step 110. If a storage device is found, flow proceeds to step 112, where meta data is read from the non-user space on the storage devices. Meta data is stored on conventional HDD's and includes non-user data such as part number of the device, serial number of the device, or other characteristics of the device. The meta data may be stored on a non-volatile portion of the storage medium.

At step 114, the meta data is evaluated to determine whether the storage device is a super set format disk. A super set format disk may be designated by an identification flag that indicates this storage device is a super set format disk type. This can be done through the use of a bit flags in non-user, meta data on the storage device. By modifying this meta-data, microcode is able to determine that the storage device is a super set format device. If the storage device is not a super set formatted device, the process ends at step 110.

If the storage device is a super set formatted device, flow proceeds to step 116 where the system configuration files on the CEC 22 are accessed. At step 118, the system determines if this storage device is already recognized. This may be performed by comparing a storage device identifier (e.g., serial number) with a record in the system configuration files. If so, no configuration of the storage device is needed as the system already can access the storage device. In this case, the set up is complete as indicated at step 132.

If the system does not recognize the storage device, flow proceeds to step 120 where an attempt is made to access system configuration data. The system configuration data includes the information used to configure the storage device, such as the bytes per sector defined by the subset format. At step 122, if no configuration data exists, flow proceeds to step 124 where a request is made to a systems administrator for the configuration data. Once located, the configuration data is determined to be valid at step 126. The validity of the configuration data may be determined by comparing the configuration data to system requirements. For example, the configuration data may specify 512 bytes per sector, but the operating system requires a different subset format. Additionally, or alternatively, the configuration data may define a 72 Gigabyte storage device, when the maximum capacity of the storage device is 36 Gigabyte. Any number of parameters may be validated in this manner. If the system configuration data is not valid, flow proceeds to step 124 to obtain valid configuration data.

Once valid system configuration data is obtained, flow proceeds to step 128 where the system configuration data is configured to recognize this storage device on subsequent boots or if the storage device is removed and then reinstalled in the system. This may be done by setting a flag in the system configuration data to indicate that this storage device is recognized. For example, the storage device serial number may be associated with a flag to indicate that it is recognized by the system.

At step 130, the meta data on the storage device is updated to indicate the subset format to be used by the storage device. This may be performed by setting a flag in the meta data to indicate the subset format. This includes the bytes per sector to be used as dictated by the system configuration data. Flow then proceeds to step 132 where the set up process is completed. A superset format storage device can also go through a "hard reformat" to clear data and reset bit flags so that it could be used for a different subset format. This could be done by the customer or at a manufacturing facility.

The superset format storage device allows a single storage device to be used with multiple systems. For example, if the systems needs a pSeries or xSeries type format with 512 bytes/sector, it would use only that subset of the bytes per sector. If the system is running OS/400 and needs a 522/byte per sector for iSeries machines it would use just that subset of bytes per sector. If a system is running a separately attached storage systems like total storage with 524 bytes per sector data field the superset format disk can be used in that mode.

Some systems are designed to run multiple logical or physical partitions each running a unique operating system image. For example, IBM has systems that can simultaneously run AIX, OS/400, and Linux. It may be desirable for partitioned systems to have multiple different subset formats used simultaneously in a single system. For systems that require multiple disks with unique formats in a single system there is a need for the system to not only be able to identify a device as a common super set format device but to also be able to tell what subset format is being used on the device. In this case, once the storage device is written with data with a specific byte per sector length another bit flag field would indicate that this storage device is being used as a specific subset format device.

Embodiments of the invention relate to a common plug compatible storage device (e.g., hard disk device) that utilizes a common superset format and accompanying microcode changes allowing the storage device to mimic multiple unique formats having data fields with byte per sector allocations equal to or less than the superset format. This allows a common storage device with this superset format to be used in systems requiring different byte per sector data fields formats without the need for the storage device to go through a hard reformat which can take a considerable amount of time. Having a common storage device part, as opposed to unique storage device parts, reduces overall inventory and thus, it is easier and more convenient to order, stock, make accurate volume forecasts, avoid scrapping unique parts since a single plug compatible part replaces multiple uniquely formatted unique disk part. This is especially useful for manufactures that produce many different types of computer and storage systems as well as customers with business environments that have multiple machine types and where the environment evolves and changes rapidly and where change is difficult to predict. The superset format storage devices may coexist with hard formatted storage devices with the subset format.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A storage device comprising:
  a storage medium having a plurality of sectors and a superset format, each sector including a header, a data section and a trailer, the data section sized to contain a number of bytes per sector equal to or greater than a maximum of subset formats to be supported;
  meta data in a non-user portion of the storage medium, the meta data including a flag for indicating a subset format such that each sector is formatted to store less than the number of bytes.

2. The storage device of claim 1 wherein:
  the sector further comprises an unused portion when the subset format defines bytes per sector less than the number of bytes.

3. The storage device of claim 1 wherein:
  the meta data includes multiple flags for defining a first portion of the storage device having a first subset format and a second portion of the storage device having a second subset format.

4. The storage device of claim 1 wherein:
the meta data includes an identification flag identifying the storage device as a superset format device.

5. The storage device of claim 1 wherein:
the meta data is stored on a non-volatile portion of said storage medium.

6. A method of configuring a storage device comprising:
detecting a presence of a storage device having a storage medium having a plurality of sectors and a superset format, each sector including a header, a data section and a trailer, the data section sized to contain a number of bytes per sector equal to or greater than a maximum of subset formats to be supported;
accessing configuration data to determine a subset format for the storage device to interface with an operating system;
configuring the storage device to the subset format without reformatting the storage device; and
setting a flag on the storage device designating the subset format.

7. The method of claim 6 wherein:
the meta data includes multiple flags for defining a first portion of the storage device having a first subset format and a second portion of the storage device having a second subset format.

8. The method of claim 6 further comprising:
reinitializing the storage device to a different subset format having a different number of bytes per sector.

9. The method of claim 6 wherein:
the configuring includes configuring the storage device to multiple subset formats such that a first portion of the storage device has a first subset format and a second portion of the storage device has a second subset format; and
the setting includes setting flags on the storage device designating the first and second subset formats.

10. The method of claim 6 further comprising:
detecting a presence of a second storage device having a storage medium having a plurality of sectors and a superset format, each sector including a header, a data section and a trailer, the data section sized to contain a number of bytes per sector equal to or greater than a maximum of subset formats to be supported;
accessing the configuration data to determine a subset format for the second storage device to interface with an operating system;
configuring the second storage device to the subset format; and
setting a flag on the second storage device designating the subset format.

11. A storage medium encoded with machine-readable computer program code configuring a storage device, the storage medium including instructions for causing a processor to implement a method, comprising:
detecting a presence of a storage device having a storage medium having a plurality of sectors and a superset format, each sector including a header, a data section and a trailer, the data section sized to contain a number of bytes per sector equal to or greater than a maximum of subset formats to be supported;
accessing configuration data to determine a subset format for the storage device to interface with an operating system;
configuring the storage device to the subset format without reformatting the storage device; and
setting a flag on the storage device designating the subset format.

12. The storage medium of claim 11 wherein:
the meta data includes multiple flags for defining a first portion of the storage device having a first subset format and a second portion of the storage device having a second subset format.

13. The storage medium of claim 11 further comprising instructions for causing a processor to implement:
reinitializing the storage device to a different subset format having a different number of bytes per sector.

14. The storage medium of claim 11 wherein:
the configuring includes configuring the storage device to multiple subset formats such that a first portion of the storage device has a first subset format and a second portion of the storage device has a second subset format; and
the setting includes setting flags on the storage device designating the first and second subset formats.

15. The storage medium of claim 11 further comprising instructions for causing a processor to implement:
detecting a presence of a second storage device having a storage medium having a plurality of sectors and a superset format, each sector including a header, a data section and a trailer, the data section sized to contain a number of bytes per sector equal to or greater than a maximum of subset formats to be supported;
accessing the configuration data to determine a subset format for the second storage device to interface with an operating system;
configuring the second storage device to the subset format; and
setting a flag on the second storage device designating the subset format.

* * * * *